US010323365B2

(12) United States Patent
Berning et al.

(10) Patent No.: US 10,323,365 B2
(45) Date of Patent: Jun. 18, 2019

(54) SELF-PROPELLED MILLING MACHINE, AS WELL AS METHOD FOR CONTROLLING A SELF-PROPELLED MILLING MACHINE

(71) Applicant: Wirtgen GmbH, Windhagen (DE)

(72) Inventors: Christian Berning, Zuelpich (DE); Andreas Vogt, Asbach (DE); Cyrus Barimani, Koenigswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/807,631

(22) Filed: Nov. 9, 2017

(65) Prior Publication Data

US 2018/0135258 A1 May 17, 2018

(30) Foreign Application Priority Data

Nov. 16, 2016 (DE) .......................... 10 2016 222 589

(51) Int. Cl.
*E01C 23/08* (2006.01)
*E01C 23/088* (2006.01)
(Continued)

(52) U.S. Cl.
CPC ............ *E01C 23/088* (2013.01); *B62D 12/02* (2013.01); *E01C 23/065* (2013.01);
(Continued)

(58) Field of Classification Search
CPC .............................. E01C 23/088; E01C 23/127
See application file for complete search history.

(56) References Cited

U.S. PATENT DOCUMENTS 3,608,968 A 9/1971 Burnett
4,376,609 A 3/1983 Bohman et al.
(Continued)

FOREIGN PATENT DOCUMENTS

DE 155157 A1 5/1982
DE 19628420 A1 1/1998
(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in he Coal Industry",1986, pp. 43-55.
(Continued)

*Primary Examiner* — Janine M Kreck
(74) *Attorney, Agent, or Firm* — Lucian Wayne Beavers; Gary L. Montle; Patterson Intellectual Property Law, PC

(57) ABSTRACT

In a self-propelled construction machine, specifically, a road milling machine, a surface miner or a recycler, for milling a ground surface, comprising a machine frame with a longitudinal axis, comprising a chassis with wheels or tracked ground-engaging units which support the machine frame, comprising a controller for the travelling and milling operation, comprising a height-adjustable working drum, comprising a slewable transport conveyor arranged in front of or behind the working drum as seen in the direction of travel of the milling machine with a discharge end from which worked-off milling material is dischargeable onto a point of impingement on a loading surface of a means of transport, wherein the transport conveyor is slewable about, as a minimum, a first slewing axis extending essentially orthogonal to the machine frame laterally under a slewing angle, wherein the controller comprises a control system which
(Continued)

controls, as a minimum, the slewing angle of the transport conveyor automatically in the travelling and milling operation, it is specified for the following features to be achieved: that the control system, at least as a function of a virtual trajectory for positioning the transport conveyor which is freely specifiable in a stationary coordinate system that is independent of the position and alignment of the machine frame, controls, by means of open-loop control or closed-loop control, at least the slewing angle of the transport conveyor automatically in such a fashion that a reference point of the transport conveyor always remains on the specified trajectory in the case of a change in position of the machine frame within the coordinate system.

31 Claims, 7 Drawing Sheets

(51) Int. Cl.
| | |
|---|---|
| E01C 23/06 | (2006.01) |
| E21C 27/36 | (2006.01) |
| E01C 23/12 | (2006.01) |
| G05D 1/02 | (2006.01) |
| B62D 12/02 | (2006.01) |

(52) U.S. Cl.
CPC ............ *E01C 23/127* (2013.01); *E21C 27/36* (2013.01); *G05D 1/0293* (2013.01); *G05D 2201/0202* (2013.01)

(56) References Cited

U.S. PATENT DOCUMENTS

| | | |
|---|---|---|
| 4,863,009 A | 9/1989 | Winkel et al. |
| 5,178,253 A | 1/1993 | Fix |
| 5,575,316 A | 11/1996 | Pollklas |
| 5,749,783 A | 5/1998 | Pollklas |
| 5,857,274 A | 1/1999 | Rudiger et al. |
| 6,247,510 B1 | 6/2001 | Diekhans et al. |
| 6,336,684 B1* | 1/2002 | Turner .................. B65G 43/08 198/301 |
| 6,366,684 B1 | 4/2002 | Gerard et al. |
| 6,682,416 B2 | 1/2004 | Behnke et al. |
| 6,943,824 B2 | 9/2005 | Alexia et al. |
| 7,831,345 B2 | 11/2010 | Heino et al. |
| 8,499,537 B2 | 8/2013 | Correns et al. |
| 8,528,988 B2 | 9/2013 | Von Schnebeck et al. |
| 8,590,983 B2 | 11/2013 | Berning et al. |
| 8,979,424 B2 | 3/2015 | Berning et al. |
| 9,126,776 B2* | 9/2015 | von Schonebeck .. E01C 23/088 |
| 9,133,587 B2 | 9/2015 | Berning et al. |
| 9,181,664 B2 | 11/2015 | Berning et al. |
| 9,764,910 B2 | 9/2017 | Berning |
| 2003/0174207 A1 | 9/2003 | Alexia et al. |
| 2005/0179309 A1 | 8/2005 | Berning et al. |
| 2005/0207841 A1 | 9/2005 | Holl et al. |
| 2006/0045621 A1 | 3/2006 | Potts et al. |
| 2006/0094487 A1 | 5/2006 | Huster et al. |
| 2008/0245042 A1 | 10/2008 | Brunnert et al. |
| 2008/0258535 A1 | 10/2008 | Berning et al. |
| 2009/0044505 A1 | 2/2009 | Huster et al. |
| 2009/0229233 A1 | 9/2009 | Pollklas et al. |
| 2009/0267402 A1 | 10/2009 | Berning et al. |
| 2010/0014917 A1 | 1/2010 | Willis et al. |
| 2010/0063692 A1 | 3/2010 | Madsen et al. |
| 2010/0070144 A1 | 3/2010 | Burke et al. |
| 2010/0296867 A1 | 11/2010 | Buschmann et al. |
| 2011/0061762 A1 | 3/2011 | Madsen et al. |
| 2011/0080034 A1 | 4/2011 | Von Schnebeck et al. |
| 2011/0123268 A1 | 5/2011 | Berning et al. |
| 2011/0307149 A1 | 12/2011 | Pighi et al. |
| 2013/0076101 A1 | 3/2013 | Simon |
| 2013/0080000 A1 | 3/2013 | Von der Lippe et al. |
| 2014/0054949 A1* | 2/2014 | Berning ................ E01C 23/088 299/1.9 |
| 2015/0218762 A1* | 8/2015 | Berning ................ E01C 23/127 299/1.9 |
| 2016/0052731 A1 | 2/2016 | Berning et al. |
| 2016/0060827 A1 | 3/2016 | Berning et al. |
| 2016/0194840 A1 | 7/2016 | Berning et al. |
| 2016/0208447 A1 | 7/2016 | Berning et al. |
| 2017/0009408 A1 | 1/2017 | Marsolek et al. |

FOREIGN PATENT DOCUMENTS

| | | |
|---|---|---|
| DE | 102005035480 A1 | 2/2007 |
| DE | 202007005756 U1 | 10/2008 |
| DE | 102009041842 A1 | 9/2011 |
| DE | 102012215013 A1 | 2/2014 |
| DE | 102014216763 A1 | 2/2016 |
| EP | 666018 A1 | 8/1995 |
| EP | 1344445 A1 | 9/2003 |
| EP | 1574122 B1 | 2/2008 |
| EP | 2100495 A1 | 9/2009 |
| EP | 2301318 B1 | 11/2011 |
| EP | 2452551 A2 | 5/2012 |
| EP | 2573266 A2 | 3/2013 |
| EP | 2573267 A1 | 3/2013 |
| EP | 2700748 A1 | 2/2014 |
| JP | 61257118 A | 11/1986 |
| JP | 09086672 A | 3/1997 |
| JP | 11050415 A | 2/1999 |
| JP | 2008163734 A | 7/2008 |
| JP | 2009263136 A | 11/2009 |
| WO | 2009098294 A2 | 8/2009 |
| WO | 2014029824 A1 | 2/2014 |
| WO | 2017125607 A1 | 7/2017 |

OTHER PUBLICATIONS

Database Compendex XP-002538699, Engineering Information, Inc., Gove et al "Optimizing Truck-Loader Matching", Mining Engineering, Oct. 1994, pp. 1179-1185, Soc. for Mining, Metallurgy & Exploration, Inc.

Office Action in U.S. Appl. No. 13/624,586 to Jom Von der Lippe, dated Mar. 31, 2015, 28 pp. (not prior art).

European Search Report in corresponding European Publication EP 13 18 1254, dated Nov. 4, 2013, 3 pp (not prior art).

\* cited by examiner

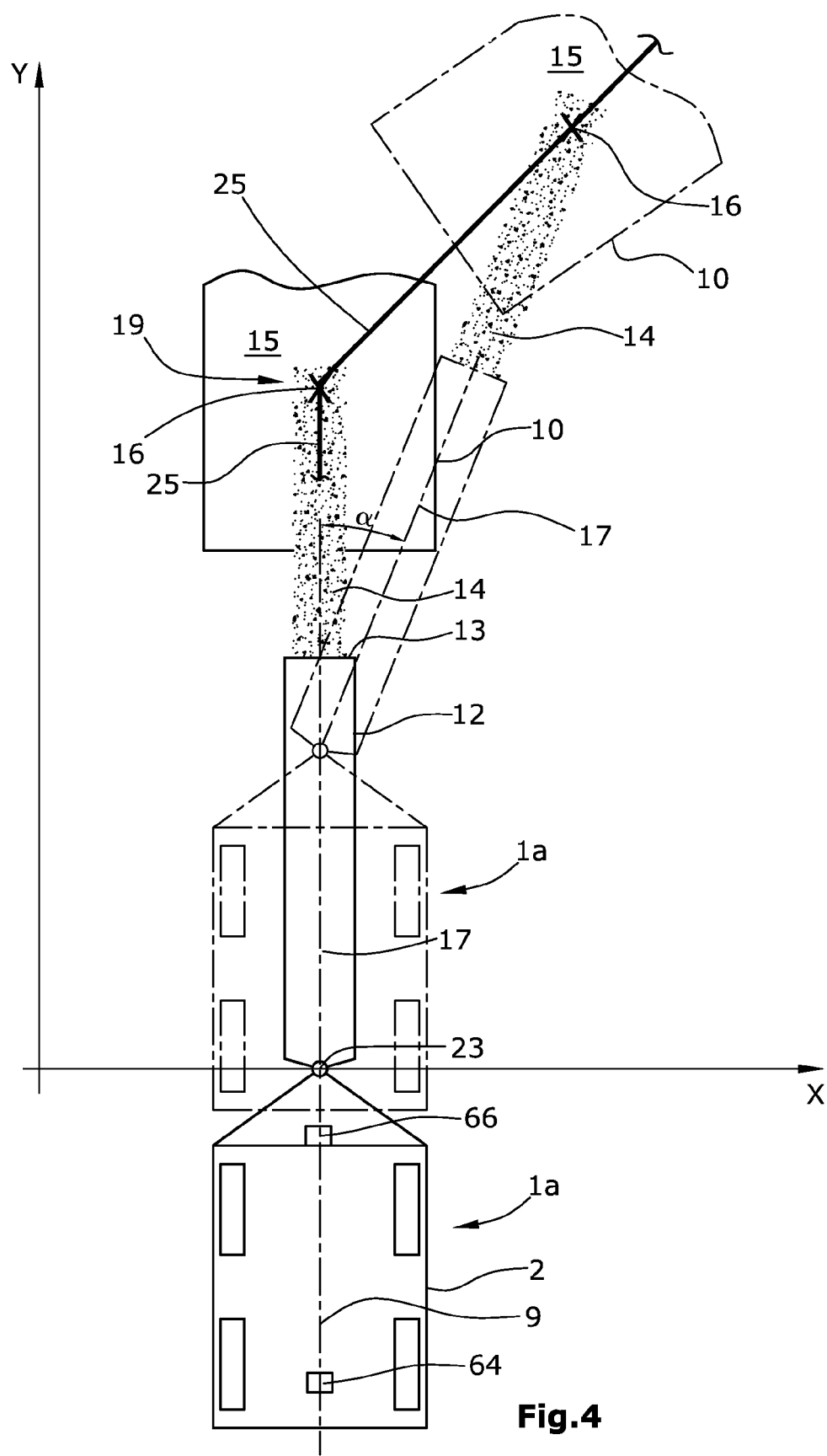

SELF-PROPELLED MILLING MACHINE, AS WELL AS METHOD FOR CONTROLLING A SELF-PROPELLED MILLING MACHINE

CROSS-REFERENCES TO RELATED APPLICATIONS

This application claims benefit of German Patent Application No. 10 2016 222 589.8, filed Nov. 16, 2016, and which is hereby incorporated by reference.

BACKGROUND

The invention relates to a self-propelled milling machine and a method for controlling a self-propelled milling machine in accordance with claims as submitted herewith.

The self-propelled milling machine, specifically, road milling machine, surface miner or recycler, comprises a machine frame with a longitudinal axis, a chassis with wheels or tracked ground-engaging units which support the machine frame, as well as a controller for the travelling and milling operation and a height-adjustable working drum. A slewable last or single transport conveyor of specified length is arranged in front of or behind the working drum as seen in the direction of travel of the milling machine, where said transport conveyor is slewable automatically about, as a minimum, an essentially vertical first axis laterally under a slewing angle. Such milling machines are known from EP 2 700 748.

The milling machine comprises a controller for the travelling and milling operation, as well as a working drum for the milling of, for example, a road pavement. A transport conveyor device comprising, as a minimum, one transport conveyor is located in front of or behind the working drum as seen in the direction of travel. Depending on where the transport conveyor is arranged, the milling machine is in the following called a front-loading/rear-loading milling machine. The transport conveyor may be slewed, relative to the longitudinal axis of the milling machine, laterally under a specifiable slewing angle to the left or right and may be adjustable in height via a specifiable elevation angle. The transport conveyor comprises a discharge end at which the milling material is unloaded, due to the conveying speed and the elevation angle, onto the loading surface of a transport vehicle via a flight path in the form of a parabolic trajectory.

A problem consists in the fact that the operator of the milling machine also needs to control loading of the loading surface by adjusting the slewing angle, the elevation angle, where appropriate, and/or the conveying speed of the transport conveyor and, by doing so, is distracted from the actual task of carrying out the milling operation. A correction of the slewing angle may be required, for example, when altering the direction of travel of the milling machine or of the transport vehicle.

In case of a rear-loading milling machine, problems also arise in coordinating the milling machine with the transport vehicle especially since the transport vehicle needs to drive behind the milling machine in reverse travel. An even higher level of stress results for the operator of the milling machine as he needs to control the milling process in forward travel on the one hand and needs to monitor loading of the transport vehicle behind the milling machine as seen in the direction of travel on the other hand, and in the process needs to control mainly the slewing angle and the elevation angle, where appropriate, and/or the conveying speed of the transport conveyor device.

The transport conveyor may be longer than the actual milling machine and usually measures approx. 5 m to approx. 8 m in length.

An automatic control of the slewing angle is specified from EP 2 700 748 which enables the operator of the milling machine to concentrate on the milling operation and on driving along a specified milling track. The milling machine can thus be moved in the direction of travel similar to a vehicle with a towed single-axle trailer.

BRIEF SUMMARY

Proceeding from such prior art, it is an object of the invention to create a self-propelled milling machine, as well as a method for controlling the milling machine in which a simplified execution of the loading process can be realized in any operating situation.

The invention advantageously specifies that a control system, at least as a function of a virtual trajectory for positioning the transport conveyor which is freely specifiable in a stationary coordinate system that is independent of the position and alignment of the machine frame, controls, by means of open-loop control or closed-loop control, at least the slewing angle of the transport conveyor automatically in such a fashion that a reference point of the transport conveyor, preferably the discharge end of the transport conveyor or the point of impingement of the worked-off milling material, always remains on the specified trajectory in the case of a change in position of the machine frame within the coordinate system.

The reference point, for example, the discharge end of the transport conveyor or the point of impingement of the worked-off milling material, is guided in an advantageous manner along a trajectory that is freely specifiable and is determined virtually within a coordinate system that is stationary relative to the ground surface. In this arrangement, the reference point of the transport conveyor is a virtual or real locus on the transport conveyor or in the extended axis of the same which represents the position of the transport conveyor.

With the position and alignment of the milling machine within the coordinate system and the course of the trajectory in the coordinate system being known, the control system can determine the slewing angle of the transport conveyor to be currently adjusted relative to the milling machine by means of calculation in such a fashion that, for example, the discharge end of the transport conveyor or the point of impingement of the worked-off milling material, respectively, always remains on the specified trajectory.

To initialize the automatic open-loop control or closed-loop control process, the coordinate system may be determined relative to the machine frame, for example, by determining the starting position of the machine as the origin of the coordinate system. In this arrangement, the slewing axis of the transport conveyor relative to the machine frame may, for example, form the reference point of the milling machine for the starting position. The Y-alignment of the coordinate system may then, for example, extend parallel to the longitudinal axis of the machine frame. During the initialization, the trajectory determined in the coordinate system should preferably extend through the current position of the reference point, for example, of the discharge end or the point of impingement, respectively.

The coordinate system or the trajectory, respectively, is aligned relative to the milling machine during initialization only, and is stationary after the initialization and therefore independent of the machine position. After the initialization, the machine thus moves in said determined coordinate system.

In the case of closed-loop control, the trajectory may be considered as command variable, the change in position of the milling machine as disturbance variable, and the slewing angle as controlled variable.

As a result, the control system can minimize the distance between the reference point of the transport conveyor and the trajectory by controlling the slewing angle.

It is preferably specified for the control system to continuously detect the current position and alignment of the machine frame in the coordinate system and to determine the slewing angle to be adjusted as a function of the position of the stationary trajectory relative to the machine frame or to the reference point of the transport conveyor.

A position determination is continuous also when performed in specified time intervals, for example, at a frequency of 1 Hz.

In a particularly preferred embodiment, it is specified that the position of the trajectory relative to the stationary coordinate system is alterable in the control system, and that the control system recalculates the slewing angle to be adjusted in case of an altered position of the trajectory in the coordinate system.

This offers the advantage that the operator can determine the position of a trajectory not only at the beginning of a milling process but can also alter the same during the operation without having to simultaneously give up the automatic adjustment of the slewing angle.

To this effect, the control system may comprise a control operating element or an input device, respectively, operable by the operator, by means of which a different trajectory is determinable in the coordinate system in the case of a desired change in the position of the current trajectory, or by means of which the alignment of the current trajectory in the coordinate system is slewable about a preset virtual axis of rotation extending essentially orthogonal to the ground surface.

The operator can therefore enter a fundamentally altered trajectory into the control system on the one hand, or can alter the alignment of a trajectory already preset in the coordinate system.

An altered course of the trajectory may also take the form of, for example, the existing trajectory being shifted in parallel if, for example, the means of transport is not driving in the extended axis of the milling track but in parallel to the milling track.

When rotating the preset trajectory about a virtual axis of rotation, the axis of rotation may be adjustable, in the extended axis of the transport conveyor, in a range between the discharge end of the transport conveyor and the calculated point of impingement, with the vertical axis of rotation preferably extending through the discharge end or the calculable point of impingement.

In an advantageous embodiment, it is specified for the control system to comprise an image-displaying device which graphically represents, as a minimum, the relative position of the currently selected trajectory in relation to the transport conveyor and/or to the longitudinal axis of the machine frame and/or to the position of the loading surface of the means of transport.

The visual representation of the trajectory enables the operator to monitor the automatic control of the slewing angle and, should the need arise, to alter the direction and the course of the trajectory by means of the control operating element.

To calculate the current position and alignment of the machine frame in the coordinate system, the control system may continuously detect the steering angle and the distance traveled, or the steering angle and the current travel speed, or may continuously detect, by means of GPS sensors, the position and alignment of the machine frame relative to the coordinate system.

In addition, different steering modes may also be taken into consideration in the calculation such as, for example, the coordinated steering of all wheels or tracked ground-engaging units by means of steering both axles in the same or in opposite directions or steering a single axle only.

The control system may, for example, determine the orthogonal distance a of a reference point on the machine frame, preferably on the longitudinal axis, to the trajectory, and the angle between the longitudinal axis of the machine frame and the trajectory.

The transport conveyor may be inclinable about a second axis extending orthogonal to the first slewing axis under a specified elevation angle, where the control system additionally continuously controls the slewing angle of the slewable transport conveyor automatically as a function of at least one of the following parameters, namely, the longitudinal and transverse inclination of the machine frame, the advance speed, the elevation angle of the transport conveyor and the conveying speed of the milling material, in such a fashion that, in any steering situation during forward travel or reverse travel, the slewable transport conveyor assumes a specified slewing angle in which the reference point of the transport conveyor is, essentially, guided along the trajectory.

The transport conveyor may also be inclinable about a second axis extending orthogonal to the first slewing axis under a specified elevation angle, where the transport conveyor discharges the milling material onto the loading surface of the means of transport at a specified conveying speed. In addition to the slewing angle of the slewable transport conveyor, the control system may control, by means of open-loop control or closed-loop control, the elevation angle and/or the conveying speed of the transport conveyor automatically in such a fashion that the reference point of the transport conveyor always remains on the specified trajectory in the case of a change in position of the machine frame within the coordinate system.

It may additionally be specified for the control system to continuously locate the position of the loading surface in the coordinate system in order to always keep the reference point of the transport conveyor, for example, the discharge end or the point of impingement along the specified trajectory within the loading surface.

The control system may comprise, as a minimum, one detector which, with the steering mode being known, directly or indirectly detects the steering angle specified by the steering controller and the distance traveled, or the steering angle and the travel speed.

The control system may receive signals from a distance measuring device by means of which the distance to a means of transport is detectable.

In a preferred embodiment, it is specified for the control system to comprise an image-capturing device which creates a real or virtual view from the perspective of the operator or from the bird's eye perspective, preferably above the virtual axis of rotation of the trajectory, where the control system inserts the virtual trajectory into the image created by the image-capturing device and displayed on the image-displaying device.

The trajectory is preferably a straight line or a curve with a specified curve radius. The trajectory may finally also, for example, be a curve progression following the course of the road which is definable as a function of a distance traveled or within the parameters of a selected coordinate system.

The straight line or curve may be entered in a relative or absolute coordinate system through, for example, a mathematical function, a curve progression through, for example, a position data field in the form of coordinate data related to the coordinate system.

The invention furthermore relates to a method for controlling a self-propelled milling machine.

Further advantageous features can be inferred from the description.

BRIEF DESCRIPTION OF THE SEVERAL VIEWS OF THE DRAWINGS

Hereinafter, embodiments of the invention are illustrated in more detail with reference to the drawings.

The following is shown:

FIG. 4 represents a schematic representation according to FIG. 3 with a different position of the trajectory.

DETAILED DESCRIPTION

The following description relates to self-propelled milling machines, specifically to road milling machines but also to surface miners and recyclers.

Figure 1:
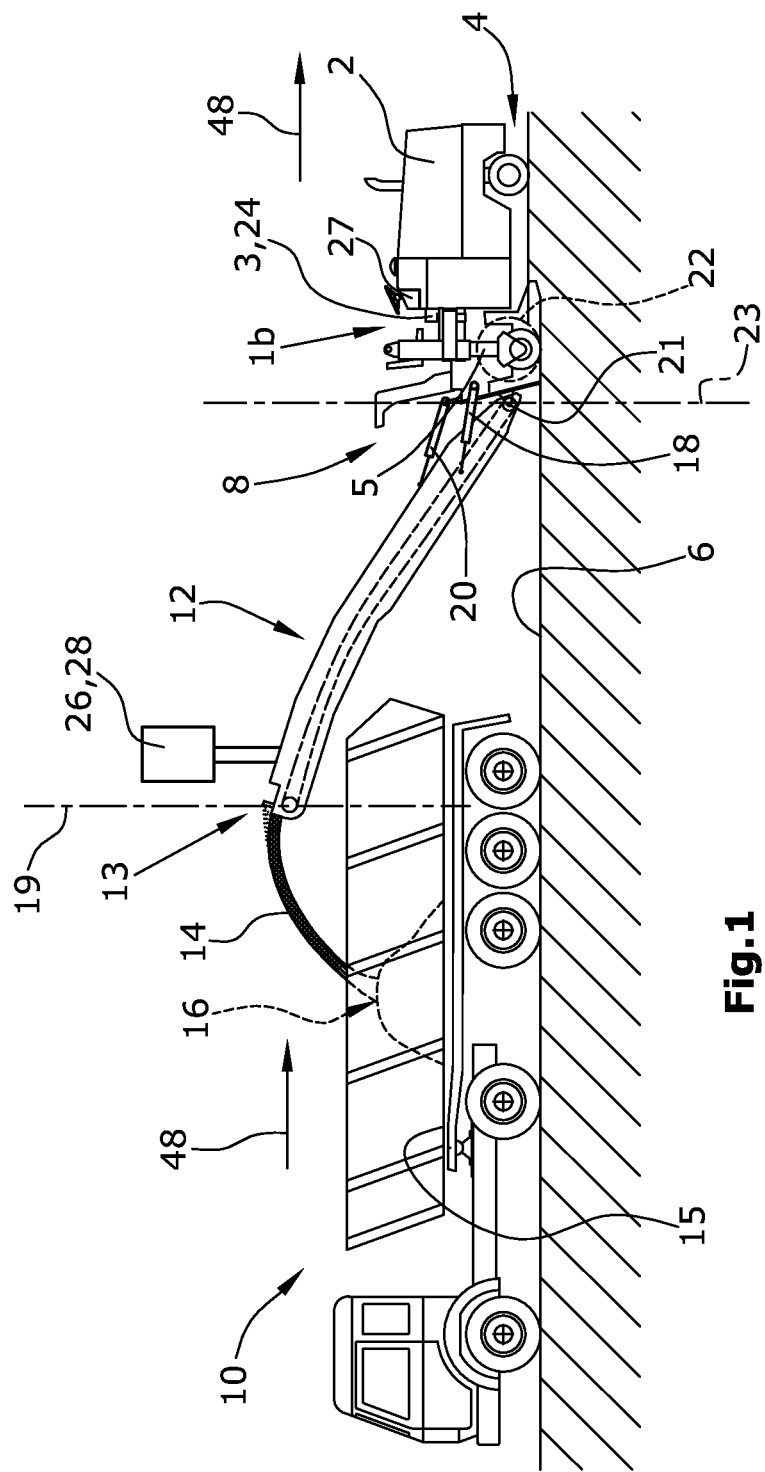
FIG. 1 represents a rear-loading road milling machine.

FIG. 1 shows the example of a rear-loading milling machine 1b in which the transport vehicle 10 travels behind the milling machine in reverse travel.

Provided that sufficient space is available on the side next to the milling machine 1b, the means of transport 10, for example, a truck, may also be moved next to the milling machine 1b in forward travel.

Figure 2:
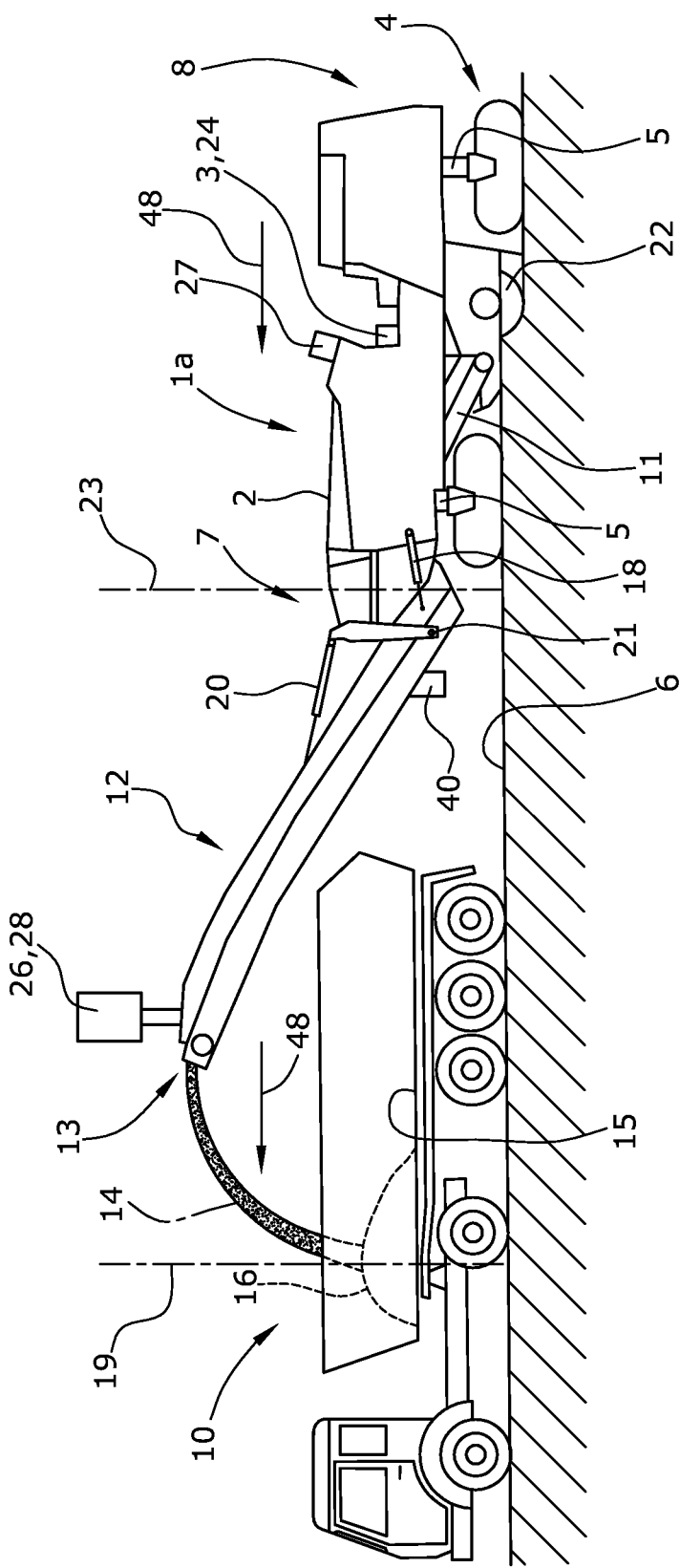
FIG. 2 represents a front-loading road milling machine.

FIG. 2 shows a milling machine using as an example a front-loading road milling machine 1a. The milling machine 1a, 1b comprises a machine frame 2 which is supported by a chassis 4 comprised of, for example, tracked ground-engaging units or wheels, said chassis 4 being connected to the machine frame 2 via no less than two height adjustment devices in the form of lifting columns 5. As can be inferred from FIG. 2, the embodiment specifies four lifting columns 5 by means of which the machine frame 2 can be brought into a specifiable plane that extends preferably parallel to the road surface 6 which the tracked ground-engaging units of the chassis 4 stand on.

The milling machine 1a shown in FIG. 2 comprises, between the tracked ground-engaging units of the chassis 4 as seen in longitudinal direction of the milling machine 1a, a working drum 22.

The working drum 22 may be adjustable in height via the lifting columns 5 supporting the machine frame 2 or relative to the machine frame 2.

The milling machines 1a, 1b may comprise steerable tracked ground-engaging units and/or wheels.

Other designs of a milling machine 1b may also feature the working drum 22, for example, at the height of the rear tracked ground-engaging units or wheels of the chassis 4, as is also depicted in FIG. 1.

A transport conveyor 12 for transporting away the milled-off milling material may also be arranged at the front end 7 or at the rear end 8 of the milling machine 1a, 1b.

The directions of travel of the respective vehicles are each indicated in FIGS. 1 and 2 by arrows 48.

In the embodiment according to FIG. 2, the milling material 14 milled off by the working drum 22 is transferred, via a first transport conveyor 11, to a second, slewable transport conveyor 12 which unloads the milling material 14 onto the loading surface 15 of the means of transport 10. As a function of the conveying speed of the transport conveyor 12, the milling material 14 is not immediately unloaded at the discharge end 13 of the transport conveyor 12, but the milling material 14 rather follows a parabolic trajectory so that the point of impingement 16 on the loading surface 15 is located at a distance from the free discharge end 13 of the transport conveyor 12 in the extended axis of the same. The transport conveyor 12 can be slewed about a slewing angle α from a neutral position to the left or to the right via piston-cylinder units 18 in order to be able to unload the milling material 14 onto the loading surface 15 even when cornering or in the event of the transport vehicle 10 driving in an offset track. In addition, the operator of the milling machine 1a, 1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

In this context, the point of impingement 16 signifies the point at which the milling material 14 discharged by the transport conveyor 12 impinges on the loading surface 15 of the means of transport 10. In addition to the slewing angle of the transport conveyor 12, said point of impingement 16 is also a function of the inclination and the conveying speed of the transport conveyor 12, as well as, to a lesser extent, of the height of the loading surface 15 and the filling state of the same. With the slewing angle α of the transport conveyor 12 being known, the point of impingement 16 can therefore be calculated with sufficient accuracy. For a more accurate calculation, the parameters of elevation angle and/or conveying speed and/or properties of the means of transport 10 may continue to also be taken into consideration.

The currently adjusted elevation angle about a horizontal axis 21, or the slewing angle α about a vertical slewing axis 23, respectively, as well as the current steering angle are reported to a control system 24 which may furthermore comprise, as a minimum, one detector 26 which continuously detects the position of the loading surface 15. Said detector 26 may be arranged either at the milling machine 1a, 1b, at the end facing the transport conveyor 12, or at the free discharge end 13 of the transport conveyor 12.

Furthermore, further detectors generally known from prior art may be in place, which directly or indirectly detect the current slewing angle and the elevation angle of the transport conveyor 12. A direct detection may be effected at the slewing axis 23, an indirect detection may be effected, for example, when the slewing/elevation angles are adjusted by means of piston-cylinder units 18, 20, and a path measuring system monitors the position of the piston-cylinder units 18, 20. Said position can then be assigned to a specific slewing/elevation angle.

The control system 24 may be integrated into the controller 3 for the travelling and milling operation operated by the operator or may, as a minimum, be connected to the same in order to, where appropriate, also obtain data on the travel speed, the distance traveled and/or a detected steering angle of the milling machine 1a, 1b and the conveying speed of the transport conveyor 12.

The control system 24 uses a stationary coordinate system independent of the position and alignment of the machine frame 2 which is initialized at a start of the milling process and stored in the control system 24 in a memory 58. The control system 24 controls the slewing angle α of the transport conveyor 12 automatically as a function of the current position of the milling machine 1a, 1b and a trajectory 25 specified in the coordinate system. The coordinate system is stationary vis-à-vis the ground surface 6 but may, during initialization, be determined in the control system 24 based on the starting position of the milling machine in that it is, for example, determined in relation to the current position of the machine during initialization. For example, the position of the machine frame 2 or of a part of the machine, for example, the position of the slewing axis 23, respectively, may be placed in the origin of the coordinate system. As is depicted in the drawings, the origin may also be placed at an offset to the position of the slewing axis 23 or in any other position the distance of which from the slewing axis 23 is known. The alignment of the machine frame 2, that is, the longitudinal axis 9 may be placed parallel to the Y-axis of the co-ordinate system.

A freely specifiable virtual trajectory 25, for example, in the form of a straight line, as can be inferred from the embodiments according to FIGS. 3 to 5a, may be entered in the control system 24 and integrated and stored in the stationary coordinate system. In the figures, the continuously drawn representation shows a starting position, whereas the dotted representation shows the situation after a change in position of the machine frame 2 or of the loading surface 15, respectively. By means of the current machine position in the coordinate system and the fixed trajectory 25 in the coordinate system, the control system 24 can control, by means of open-loop control or closed-loop control, the slewing angle α of the transport conveyor 12 about the vertical slewing axis 23 automatically in such a fashion that, in the case of a change in position of the machine frame 2, a reference point of the transport conveyor 12 is always kept on the trajectory specified. Most appropriately, such reference point is, for example, the discharge end 13 of the transport conveyor 12.

Figure 3:
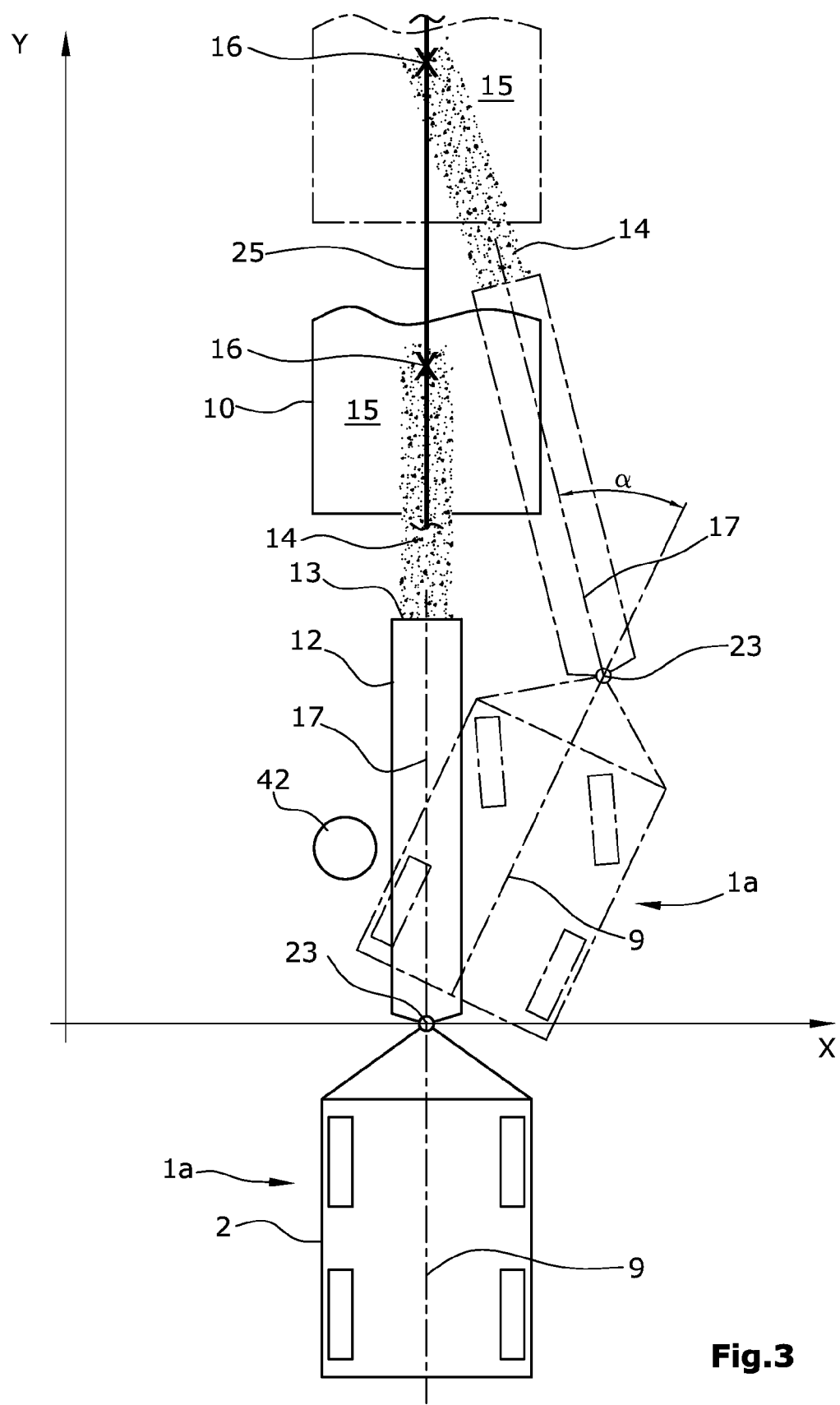
FIG. 3 represents a schematic representation of a starting position of the milling machine in the coordinate system, as well as the automatic control of the slewing angle in the case of a change in position of the milling machine.

FIG. 3 shows a simple embodiment in which the longitudinal axis 9 of the machine frame 2 of the milling machine 1a and the longitudinal central axis 17 of the transport conveyor 12 are aligned rectilinearly to one another in the starting position, that is, the current slewing angle α of the transport conveyor 12 is zero relative to the machine frame 2.

In the extended axis of the transport conveyor 12 beyond the discharge end 13, the point of impingement 16 on the loading surface 15 of the means of transport 10 is shown which, in the starting position, is also aligned collinearly to the longitudinal central axis 17 and the longitudinal axis 9.

In FIGS. 3 and 4, the coordinate system is aligned, with its Y-axis, parallel to the longitudinal axis 9 of the machine frame 2, with the origin being depicted at an offset to the slewing axis 23 for better visualization, so that the starting position of the machine in FIG. 3 has the coordinates (x, 0). It is preferred, however, to determine the origin of the coordinate system automatically in relation to a fixed reference point of the machine frame, for example, the slewing axis 23, with the Y-axis being aligned in parallel to the longitudinal axis 9 of the machine frame 2. Alternatively, the Y-axis may, for example, be aligned parallel to the longitudinal axis 17 of the transport conveyor 12.

Proceeding from such situation, in which the machine frame 2, the transport conveyor 12, the means of transport 10 and the specified trajectory 25 are collinear, the situation is depicted in dotted lines in FIG. 3 in which the milling machine 1a is required to drive around a manhole cover 42. The process results in a change in the position and alignment of the machine frame 2 in the determined coordinate system. By means of the continuous detection of said changes in position and alignment, the control system 24 can automatically establish and control, by means of closed-loop control, the required alteration of the slewing angle α for the transport conveyor 12. It can be inferred from the dotted representation that despite the change in the position of the milling machine 1a, due to this control process, the point of impingement 16 of the milling material always remains on the trajectory 25.

It is understood that, in lieu of the point of impingement 16, a different reference point to the transport conveyor 12 which is a function of the slewing movement of the transport conveyor 12 may also be selected such as, for example, the discharge end 13, or a different reference point on the transport conveyor 12 or in the extended axis of the same.

FIG. 4 shows a starting position in which the milling machine 1a, the transport conveyor 12 and the means of transport 10 are initially aligned collinearly but the specified trajectory 25 has been altered in such a fashion that it extends, proceeding from the starting position depicted, obliquely to the longitudinal axis 9 of the machine frame 2 and the longitudinal central axis 17 of the transport conveyor 12. Such intervention may be effected, for example, when the operator of the milling machine perceives that the means of transport 10 is performing a steering movement and is therefore no longer moving collinearly to the longitudinal axis 9 of the machine frame 2 or the transport conveyor 12, respectively. Such a situation may arise, for example, when the means of transport 10 enters a bend ahead of the milling machine 1a, 1b.

After both the means of transport 10 and the milling machine 1a have changed their positions, it is apparent that, in this case also, the slewing angle α can be controlled, by means of closed-loop control, automatically without any intervention by the operator in that, in this case, the point of impingement 16 follows the altered trajectory 25 automatically during the forward travel of the milling machine 1a.

Figure 5A:
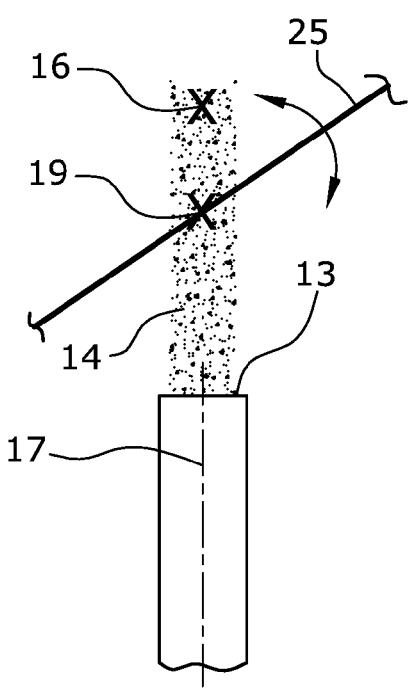
FIG. 5a represents the slewability of the trajectory about a virtual slewing axis.
Figure 5B:
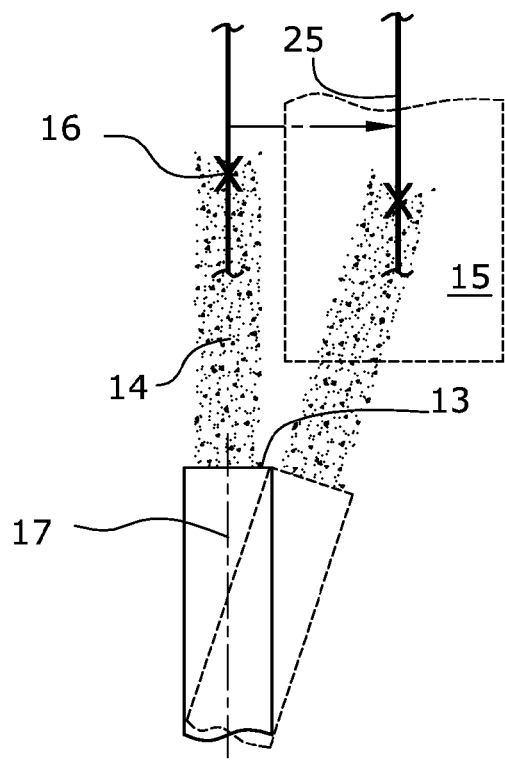
FIG. 5b represents the parallel shift of a trajectory.
Figure 5C:
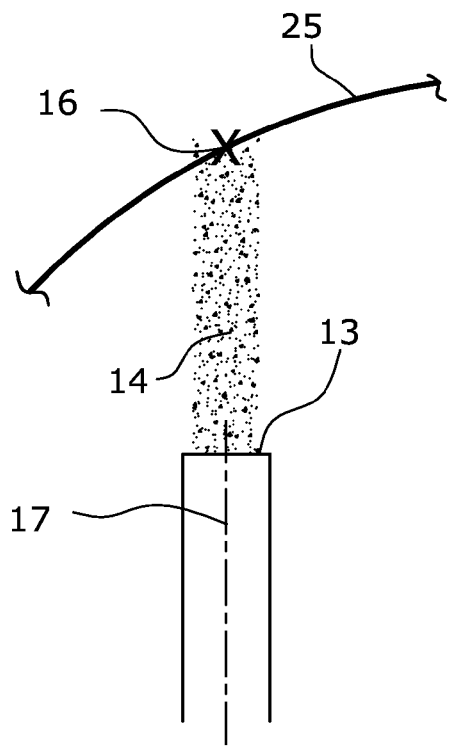
FIG. 5c represents a curve-shaped trajectory.

FIGS. 5a, 5b, 5c show further embodiments in which the operator can vary the position of the trajectory 25 within the coordinate system.

An operating element 27 is specified for this purpose which is connected with the control system 24. In the case of a desired change in the position of the current trajectory 25, an altered course of the trajectory 25 in the coordinate system is determinable via the operating element 27 in that, for example, the trajectory 25 is rotated in the coordinate system (FIG. 5a) or shifted in parallel (FIG. 5b). The control element 27 may, for example, comprise a rotary switch which is rotatable in two directions for the purpose of rotating the trajectory, and is movable laterally to the left or right for the purpose of parallel shifting. Furthermore, the operating element 27 may comprise an input device. Alternatively, an input of data may be effected via an input device of the controller 3 not depicted.

If a different, for example, a curved trajectory 25 (FIG. 5c) or a curve progression is to be entered, the input of data may also be effected via the operating element 27.

In FIG. 5a, the current trajectory 25 is slewed about a preset virtual axis of rotation 19 extending essentially orthogonal to the ground surface 6. The vertical axis of rotation 19 may be adjustable in the extended axis of the transport conveyor 12 preferably in a range between the discharge end 13 and the calculated point of impingement 16, where, however, the virtual axis of rotation 19 is to preferably extend through the discharge end 13 (FIGS. 1 and 6) or through the point of impingement 16 (FIGS. 2 and 4). It may furthermore be specified that the position of the virtual axis of rotation 19 can be altered by the machine operator via the operating element 27.

The parallel shift of the trajectory 25 depicted in FIG. 5b may be required, for example, at the beginning of the milling work when the system is prepared for loading onto a means of transport 10 driving parallel to the milling track.

During initialization, the trajectory 25 is collinear to the longitudinal axis 9 of the machine frame 2 and is then shifted in parallel in the coordinate system prior to the start of the milling process in such a fashion that it is collinear to the longitudinal central axis of the means of transport 10.

An image-displaying device 30 may graphically represent, as a minimum, the relative position of the currently selected trajectory 25 in relation to the transport conveyor 12 and/or to the longitudinal axis 9 of the machine frame 2 and/or to the position of the loading surface 15 of the means of transport 10, provided that a location of the position of the loading surface 15 is specified.

In addition, an image-capturing device 28 may be specified which creates a real or virtual view from the perspective of the operator or from the bird's eye perspective in the form of an image. The bird's eye perspective is preferably created above the virtual axis of rotation 19 of the trajectory 25. The control system 24 may insert the virtual trajectory 25 into the image created by the image-capturing device 28 and displayed on the image-displaying device 30.

Figure 6:
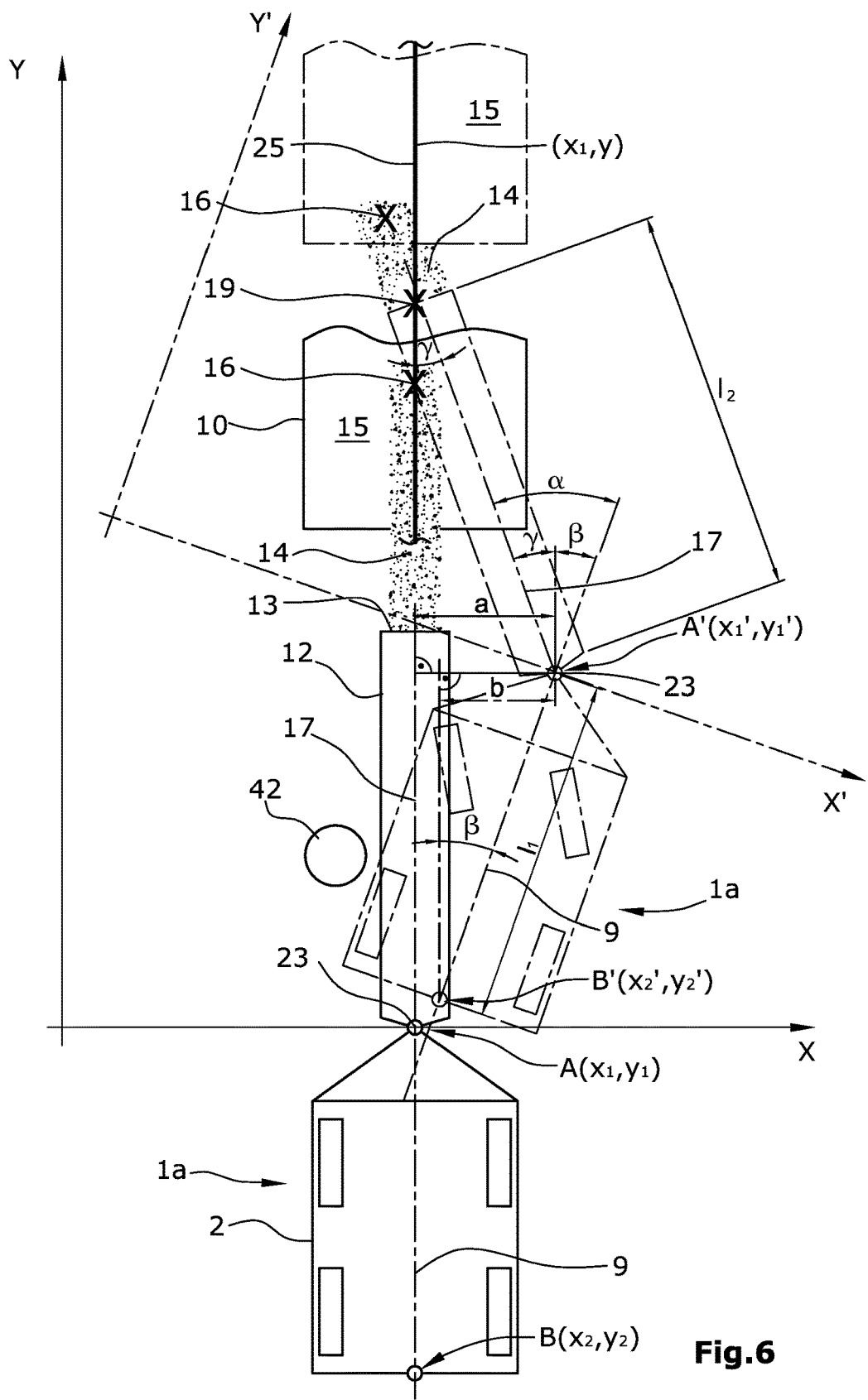
FIG. 6 represents an example of the calculation of the slewing angle to be adjusted.

The milling machine 1a represented schematically in FIG. 6 by continuously drawn lines shows the starting position in which a coordinate system X, Y is defined relative to the milling machine. In this embodiment, the specified trajectory 25 is on one axis with the longitudinal axis 9 of the machine frame 2 in the starting position. When the milling machine 1a begins to move, the distance traveled by the milling machine and the steering angle adjusted in the process are continuously detected via sensors 50 to 52.

The distance traveled by a reference point on the machine frame 2, for example, the slewing axis 23, and the altered alignment of the machine frame 2 relative to the Y-axis of the coordinate system (angle β) can be determined from these data. The position and alignment of the machine frame 2 of the milling machine in the coordinate system X, Y defined during initialization can thus be determined unambiguously. In conjunction with the position and alignment of the trajectory 25 which is also determined unambiguously in the coordinate system, the slewing angle α can thus be determined in such a fashion that the reference point, which in FIG. 6 is the end 13 of the transport conveyor 12, is located on the trajectory 25.

In this context, it may be specified for the control system 24 to continuously establish the altered position data in the coordinate system X, Y of the milling machine 1a in relation to the starting position.

Alternatively, this process may be performed iteratively, that is, following control to adjust the current slewing angle, a new coordinate system (X', Y') may be defined at a "new" position of the milling machine (represented in dotted lines) in that the current position is adopted as the starting position. The position of the trajectory is then translated relative to said new coordinate system X', Y' and stored, and in the case of a further change in the position of the milling machine, the relative movement of the milling machine is established in the new coordinate system X', Y'.

In FIG. 6, an example is depicted as to how the slewing angle α can be calculated in the coordinate system Y, X. For this purpose, reference points A, B are determined at the machine frame 2 which have the coordinates A=(x1, y2) and B=(x2, y2) in the coordinate system X, Y. The reference point A may, for example, be the slewing axis 23. In FIG. 6, the reference point A would have the co-ordinates x1, 0; it is understood, however, that the reference point A may also have the coordinates (0, 0) in relation to the coordinate system X, Y. In the embodiment according to FIG. 6, the trajectory 25 is a straight line which may be entered in the coordinate system X, Y via a linear equation.

FIG. 6 shows a starting situation in which the longitudinal axis of the machine frame 2, the longitudinal central axis 17 of the transport conveyor 12 and the trajectory 25 are collinear. When, following initialization, the milling machine 1a has moved to the position of the reference points A' (x1', y1') and B' (x2', y2'), the distance a to the trajectory 25 can be calculated as follows:

In an initial step, the angle β between the longitudinal axis 9 of the machine frame 2 and the trajectory 25 extending parallel to the Y-axis of the coordinate system X, Y needs to be determined, where the length between the reference points A and B is given with l1, and the length of the opposite cathetus b in the right-angled triangle in which the length l1 forms the hypotenuse is calculated from the difference of the x-coordinates of the reference points B' and A' as follows:

$$b=|x1'-x2'|$$

For the dotted position of the milling machine, the angle β between the longitudinal axis 9 and the Y-axis of the coordinate system, and therefore the trajectory 25 then results in:

$$\beta=\arcsin[(x1'-x2')/l1]$$

For the calculation of the slewing angle α to be adjusted, the distance a of the reference point A' to the trajectory 25 results from:

$$a=|x1'-x1|,$$

where x1 is also the constant x-coordinate of the trajectory 25.

The angle α to be adjusted results from the sum of the previously determined angle β and the angle γ, where γ is the angle between the longitudinal central axis 17 of the transport conveyor 12 and the trajectory 25 resulting from the adjustment of the slewing angle β.

With the given length l2 between the slewing axis 23 and the reference point of the transport conveyor 12 projected on the coordinate system, the angle γ can be calculated as:

$$\gamma=\arcsin(a/l2).$$

In the embodiment according to FIG. 6, the reference point of the transport conveyor 12 is the discharge end 13 of the transport conveyor where the virtual axis 19 may also be specified.

Instead of determining the position of two reference points on the machine frame A, B, it may also be specified to determine the position of a single point only if the angular change of the longitudinal axis 9 of the machine frame relative to the starting position is additionally determined based on the distance traveled and the steering angles adjusted in the process. The angle β can thus be determined directly.

Figure 7:
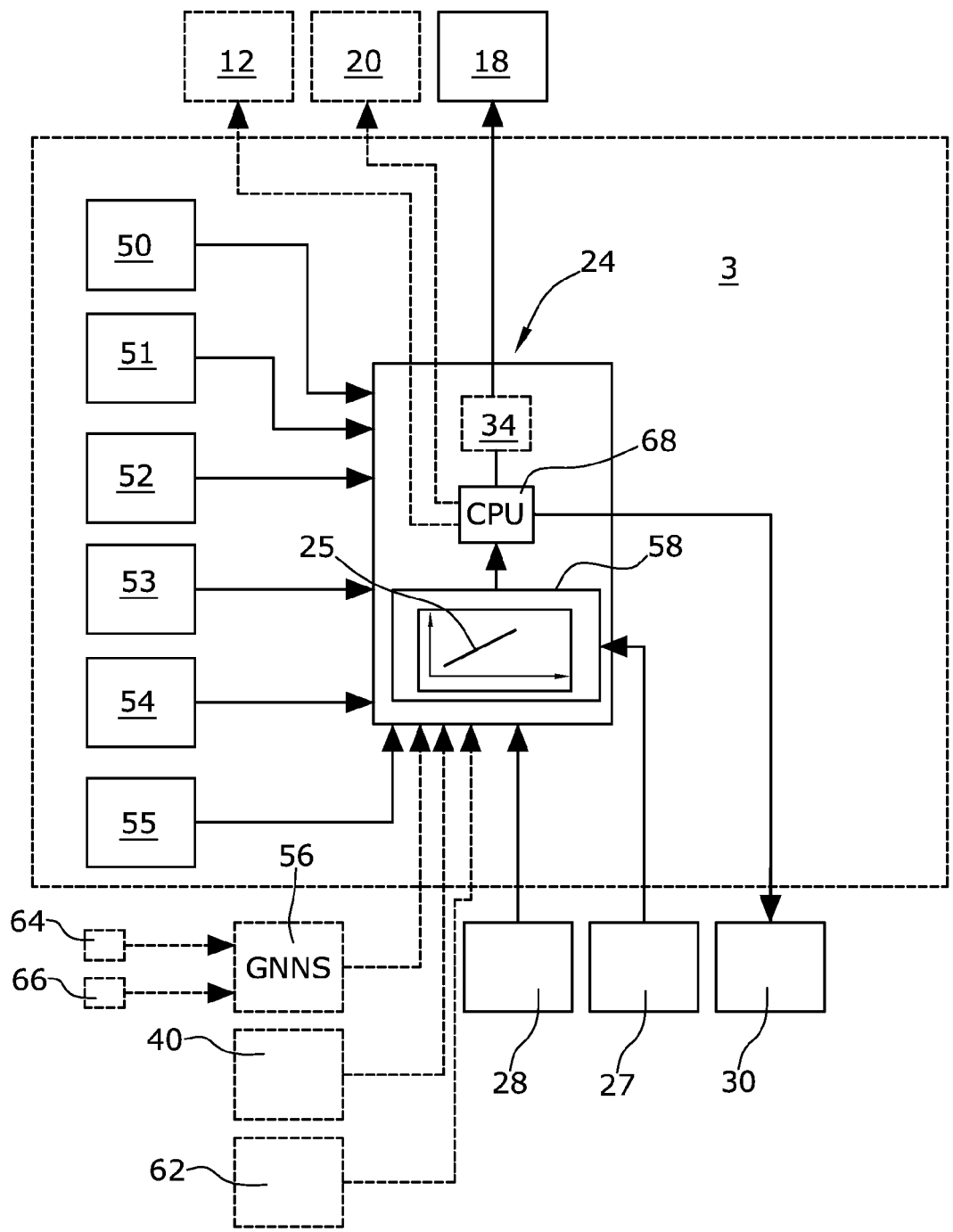
FIG. 7 represents a schematic circuit diagram of the control and detection device.

FIG. 7 shows a possible structure of the control system 24 within the controller 3 and the elements interacting with the same. In this arrangement, proceeding from a starting position of the milling machine 1a, 1b during the initialization for tracking the change in position of the milling machine 1a, 1b, the control system 24 may receive signals 50 to 55 from the controller 3 or directly from corresponding detectors.

The controller 3 may specifically transmit to the control system 24 signals 50 relating to the steering angle and steering mode, signals 51 relating to the travel speed, signals 52 relating to the distance traveled, signals 53 relating to the current slewing angle, signals 54 relating to the conveying speed of the transport conveyor 12, as well as signals 55 relating to the elevation angle of the transport conveyor.

The control system 24 additionally receives signals from the image-capturing device 28, the control operating element 27, and in turn emits video signals to the image-displaying device 30.

Moreover, the control system 24 may comprise, in all embodiments, a monitoring device 34 which compares the calculated slewing angle α with a specified maximum slewing angle range for the slewing angle and, in the case of the maximum possible or permissible slewing angle being exceeded, generates an alarm signal for the operator and/or a stop signal for the milling machine 1a, 1b.

Notwithstanding the above, the monitoring device 34 may also generate an alarm signal for the operator or a stop signal for the milling machine 1a, 1b if the maximum possible or permissible slewing angle range of the transport conveyor is not sufficient to follow the trajectory.

The control system 24 also emits, via a CPU processor unit 68, the open-loop control or closed-loop control signal, respectively, for the slewing angle α to activate the piston-cylinder units 18 for adjusting the slewing angle, where the monitoring device 34 may be interposed.

Moreover, the control system 24 may, besides activating the piston-cylinder units 18, additionally also perform the activation of the piston-cylinder units 20 and/or an alteration of the conveying speed of the transport conveyor 12.

The automatic control of the slewing angle α is effected in such a fashion that the reference point of the transport conveyor 12 always remains on the trajectory 25.

In the process, the calculation of the slewing angle α is effected on the basis of the known dimensions of the machine frame 2 and the transport conveyor 12, and the data of the coordinate system stored in the memory 58, and the trajectory 25.

When the initialization process is started, the position of the coordinate system may be determined in the memory 58, and a trajectory 25 to be specified may be selected or altered and stored in the coordinate system. During initialization, the coordinate system is aligned preferably parallel to the longitudinal axis 9 of the machine frame 2, and the origin of the coordinate system is placed, for example, on the slewing axis 23. There is also always the possibility to re-determine the origin and alignment of the coordinate system X, Y relative to the machine frame 2 and to thus reinitialize the coordinate system as shown, for example, in FIG. 6 with the coordinate system X', Y'. During initialization, the longitudinal axis 9 of the machine frame 2, as well as the longitudinal central axis 17 of the transport conveyor 12, as well as the loading surface 15 of the means of transport 10, are preferably aligned collinearly.

Different trajectories 25 can be selected and positioned in the coordinate system via the operating element 27. In the simplest case, the trajectory is a straight line. The position of the trajectory 25 in the coordinate system can be altered by means of the operating element 27; as shown in FIG. 4, the trajectory 25 can, for example, be slewed about the virtual vertical slewing axis 19.

The information on the trajectory 25 entered, for example, via the control element 27 or via an input device of the controller 3, as well as, where appropriate, the video signals of the image-capturing system 28 may be emitted to the image-displaying device 30 in a combined fashion so that the operator can monitor the automatic operation of the slewing angle control starting after the initialization of the milling machine 1a, 1b on the image-displaying device 30 and, should the need arise, can influence the orientation of the trajectory 25 by means of the control operating element 27.

Moreover, the control system 24 may receive signals from a distance-measuring device 40 by means of which the distance to a means of transport 10 following behind or driving ahead is detectable.

The control system 24 may continuously detect the position of the loading surface 15 and/or the transport conveyor 12 by means of the image-capturing system 28 or a non-optical electronic location system 62 which supplies data for determining the position of the loading surface 15 and for display on the image-displaying device 30 in relation to the machine frame 2 or to the transport conveyor 12. The information from the image-capturing system 28 may be evaluated by means of image-analysing methods which are known for themselves. An example of a non-optical electronic location system is a radio-frequency identification system (RFID) which additionally offers the possibility to identify a specific loading surface 15 of a specific means of transport 10.

When locating the loading surface 15 by means of RFID, stationary RFID tags may be used at the means of transport 10, specifically, at the loading surface 15.

Alternatively or additionally, signals from a GNSS device 56, for example, GPS, GLONASS, Galileo, may be entered for position determination. The machine frame 2 preferably possesses, as a minimum, two GNSS receivers 64, 66 attached in different positions on the machine which, in addition to the position, also determine the alignment of the machine frame 2.

The trajectory 25 is determined in the memory 58 relative to the coordinate system by means of, for example, the operating device 27. During initialization, the trajectory 25 may, for example, initially be determined relative to the machine frame 2. The coordinates of the trajectory 25 in the GNSS coordinate system can therefore be established and transferred into the memory 58 based on the position of the trajectory 25 in relation to the coordinates of the machine frame 2 or the slewing axis 23.

As soon as the milling machine 1a, 1b changes its position, the altered GNSS position coordinates of the machine and the machine alignment are detected while the coordinates of the trajectory within the GNSS coordinate system re-main unchanged. The relative movement between the machine frame 2 and the trajectory 25, as well as the angular change between the trajectory 25 and the longitudinal axis 9 of the machine frame 2 can thus be established and, as a result, the slewing angle α controlled in such a fashion that the reference point of the transport conveyor 12 is on the coordinates of the trajectory 25.

In case of a change in the course of the trajectory 25, it is necessary to change the coordinates describing the trajectory 25.

Determination of the machine position and of the alignment of the same is known prior art.

Two GPS sensors 64, 66 are shown in FIG. 4, for example, by means of which it is possible to determine the position and to determine the alignment of the machine frame 3.

What is claimed is:

1. A self-propelled milling machine for milling a ground surface, comprising:
    a machine frame with a longitudinal axis;
    a height-adjustable working drum;
    a slewable transport conveyor arranged in front of or behind the working drum as seen in the direction of travel of the milling machine, with a discharge end from which worked-off milling material is dischargeable onto a point of impingement on a loading surface of a transport vehicle,
    wherein the transport conveyor is laterally slewable to a slewing angle, about at least a first slewing axis extending essentially orthogonal to the machine frame; and
    a controller configured to control the slewing angle of the transport conveyor automatically in travelling and milling operations, at least as a function of a virtual trajectory for positioning the transport conveyor which is specified in a stationary coordinate system independent of the position and alignment of the machine frame, wherein a reference point of the transport conveyor remains on the specified trajectory responsive to a change in position of the machine frame within the coordinate system.

2. The self-propelled milling machine of claim 1, wherein the reference point of the transport conveyor comprises the discharge end of the transport conveyor or the point of impingement of the worked-off milling material.

3. The self-propelled milling machine of claim 1, wherein the self-propelled milling machine is a road milling machine.

4. The self-propelled milling machine of claim 1, wherein the self-propelled milling machine is a surface miner.

5. The self-propelled milling machine of claim 1, wherein the self-propelled milling machine is a recycler.

6. The self-propelled milling machine of claim 1, wherein the controller is configured to continuously detect the current position and alignment of the machine frame in the coordinate system and to determine the slewing angle to be adjusted as a function of the position of the specified trajectory relative to the machine frame.

7. The self-propelled milling machine of claim 1, wherein the controller is configured to continuously detect the current position and alignment of the machine frame in the coordinate system and to determine the slewing angle to be adjusted as a function of the position of the specified trajectory relative to the reference point of the transport conveyor.

8. The self-propelled milling machine of claim 1, wherein the controller is configured to alter a position of the trajectory relative to the stationary coordinate system, and to recalculate a current slewing angle in response thereto.

9. The self-propelled milling machine of claim 1, wherein the controller is configured, responsive to input from an operator and a desired change in the position of the trajectory, to determine a different course of the trajectory in the coordinate system.

10. The self-propelled milling machine of claim 1, wherein the controller is configured, responsive to input from an operator, to slew the alignment of the trajectory in the coordinate system about a preset virtual axis of rotation extending essentially orthogonal to the ground surface.

11. The self-propelled milling machine of claim 1, further comprising an image-displaying device which graphically represents at least a relative position of the trajectory in relation to the transport conveyor.

12. The self-propelled milling machine of claim 1, further comprising an image-displaying device which graphically represents at least a relative position of the trajectory in relation to the longitudinal axis of the machine frame.

13. The self-propelled milling machine of claim 1, further comprising an image-displaying device which graphically represents at least a relative position of the trajectory in relation to the position of the loading surface of the transport vehicle.

14. The self-propelled milling machine of claim 1, further comprising an image-displaying device which graphically represents at least a relative position of the trajectory in relation to the transport conveyor and to the longitudinal axis of the machine frame.

15. The self-propelled milling machine of claim 1, further comprising an image-displaying device which graphically represents at least a relative position of the trajectory in relation to each of the transport conveyor, the longitudinal axis of the machine frame, and the position of the loading surface of the transport vehicle.

16. The self-propelled milling machine of claim 1, wherein the controller is configured to continuously detect the steering angle and the distance travelled, and to calculate the current position and alignment of the machine frame in the coordinate system based at least in part thereon.

17. The self-propelled milling machine of claim 1, wherein the controller is configured to continuously detect the steering angle and the current travel speed, and to calculate the current position and alignment of the machine frame in the coordinate system based at least in part thereon.

18. The self-propelled milling machine of claim 1, wherein the controller is configured to continuously detect the position and alignment of the machine frame relative to the coordinate system via a GNSS position determination device, and to calculate the current position and alignment of the machine frame in the coordinate system based at least in part thereon.

19. The self-propelled milling machine of claim 1, wherein the controller is configured to determine the distance (a) between a reference point and the trajectory, and the angle B between the longitudinal axis of the machine frame and the trajectory.

20. The self-propelled milling machine of claim 19, wherein the reference point is on the longitudinal axis of the machine frame.

21. The self-propelled milling machine of claim 1, wherein the transport conveyor is pivotable to a specified elevation angle and about a second axis extending orthogonal to the first slewing axis, wherein the transport conveyor discharges the milling material onto the loading surface of the transport vehicle at a specified conveying speed, and wherein the controller is configured to continuously control the slewing angle of the slewable transport conveyor automatically as a function of at least one of the following parameters, namely, the longitudinal and transverse inclination of the machine frame, the advance speed, the elevation angle of the transport conveyor and the conveying speed of the milling material, in such a fashion that, in any steering situation during forward travel or reverse travel, the slewable transport conveyor assumes a specified slewing angle in which the reference point of the transport conveyor is guided along the trajectory.

22. The self-propelled milling machine of claim 1, wherein the transport conveyor is inclinable to a specified elevation angle and about a second axis extending orthogonal to the first slewing axis, wherein the transport conveyor discharges the milling material onto the loading surface of the transport vehicle at a specified conveying speed, and the controller is further configured to control either or both of the elevation angle of the transport conveyor and the conveying speed of the transport conveyor automatically, in such a fashion that the reference point of the transport conveyor always remains on the specified trajectory in the case of a change in position of the machine frame within the coordinate system.

23. The self-propelled milling machine of claim 1, wherein the controller is configured to continuously locate the position of the loading surface in the coordinate system, and to control the slewing angle to maintain the discharge end of the transport conveyor or the point of impingement along the specified trajectory within the loading surface.

24. The self-propelled milling machine of claim 1, further comprising an image-capturing device which creates an image view from a perspective of the operator or from a bird's eye perspective, wherein the controller is configured to insert a virtual trajectory into the image created by the image-capturing device and displayed on an image-displaying device.

25. The self-propelled milling machine of claim 24, wherein the created image view is a real or virtual view created above a virtual axis of rotation of the trajectory.

26. A method for controlling a self-propelled milling machine for milling a ground surface, wherein milling material worked off by a working drum in the milling operation is transported away by a transport conveyor comprising a discharge end, and is discharged from the discharge end onto a point of impingement on a loading surface of a transport vehicle, and wherein the transport conveyor can be automatically slewed at least laterally in the travelling and milling operation, the method comprising:

receiving one or more inputs to a controller specifying a virtual trajectory for positioning the transport conveyor or the point of impingement which is freely selectable in a stationary coordinate system that is independent of the position and alignment of the machine frame; and controlling at least the slewing angle of the transport conveyor in such a fashion that a reference point of the transport conveyor is always kept on the specified trajectory responsive to a change in position of the milling machine in the coordinate system.

27. The method of claim 26, comprising:

continuously detecting a current position and alignment of the machine frame in the coordinate system, and determining the slewing angle to be adjusted as a function of the position of the specified trajectory relative to the machine frame.

28. The method of claim 26, wherein a different trajectory is entered in the coordinate system, responsive to a desired change in the course of the trajectory.

29. The method of claim 26, comprising:

altering an alignment of the trajectory in the coordinate system about a preset virtual axis of rotation extending orthogonal to the ground surface, responsive to a desired change in the course of the trajectory.

30. The method of claim 26, comprising:

altering an alignment of the trajectory in the coordinate system about a preset virtual axis of rotation extending orthogonal to the ground surface and located on or in an extended axis of the transport conveyor, responsive to a desired change in the course of the trajectory.

31. The method of claim 26, wherein a current position and alignment of the machine frame in the coordinate system are calculated by continuously detecting parameters selected from a group comprising one or more of: a steering angle and distance travelled; the steering angle and a current travel speed; and a position and alignment of the machine frame relative to the coordinate system, as detected via a GNSS position determination device.

\* \* \* \* \*